United States Patent
Patel et al.

(10) Patent No.: US 9,831,510 B2
(45) Date of Patent: Nov. 28, 2017

(54) FUEL CELL SYSTEM BLOWER CONFIGURATION

(71) Applicant: Audi AG, Ingolstadt (DE)

(72) Inventors: Kirtikumar H. Patel, Berlin, CT (US); Kazuo Saito, Glastonbury, CT (US)

(73) Assignee: Audi AG, Ingolstadt (DE)

( * ) Notice: Subject to any disclaimer, the term of this patent is extended or adjusted under 35 U.S.C. 154(b) by 875 days.

(21) Appl. No.: 13/872,237

(22) Filed: Apr. 29, 2013

(65) Prior Publication Data

US 2014/0322621 A1    Oct. 30, 2014

(51) Int. Cl.

| | | |
|---|---|---|
| H01M 8/04 | (2016.01) | |
| H01M 8/04082 | (2016.01) | |
| H01M 8/04089 | (2016.01) | |
| F04D 25/08 | (2006.01) | |
| F04D 25/16 | (2006.01) | |
| F04D 29/58 | (2006.01) | |

(52) U.S. Cl.
CPC ...... *H01M 8/04201* (2013.01); *F04D 25/082* (2013.01); *F04D 25/166* (2013.01); *F04D 29/5806* (2013.01); *H01M 8/04097* (2013.01)

(58) Field of Classification Search
None
See application file for complete search history.

(56) References Cited

U.S. PATENT DOCUMENTS

| | | | | |
|---|---|---|---|---|
| 4,427,309 A | * | 1/1984 | Blake | .................... F01D 25/166 384/286 |
| 2002/0023624 A1 | * | 2/2002 | Meisner | ................... F01M 1/02 123/502 |
| 2002/0114985 A1 | * | 8/2002 | Shkolnik | ................. H01M 8/00 429/425 |

(Continued)

FOREIGN PATENT DOCUMENTS

| | | |
|---|---|---|
| CN | 101981737 A | 2/2011 |
| CN | 102094840 A | 6/2011 |

(Continued)

OTHER PUBLICATIONS

International Search Report and Written Opinion, dated Aug. 21, 2014, for International Application No. PCT/US2014/034852, 11 pages.

(Continued)

*Primary Examiner* — Jonathan Crepeau
*Assistant Examiner* — Jacob Buchanan
(74) *Attorney, Agent, or Firm* — Seed IP Law Group LLP

(57) ABSTRACT

An exemplary fuel cell system includes a cell stack assembly having a plurality of cathode components and a plurality of anode components. A first reactant blower has an outlet situated to provide a first reactant to the cathode components. A second reactant blower has an outlet situated to provide a second reactant to the anode components. The second reactant blower includes a fan portion that moves the second reactant through the outlet. The second reactant blower also includes a motor portion that drives the fan (Continued)

portion and a bearing portion associated with the fan portion and the motor portion. The motor portion has a motor coolant inlet coupled with the outlet of the first reactant blower to receive some of the first reactant for cooling the motor portion.

23 Claims, 3 Drawing Sheets

(56) References Cited

U.S. PATENT DOCUMENTS

| | | | |
|---|---|---|---|
| 2004/0197205 A1 | 10/2004 | Hobmeyr et al. | |
| 2004/0219401 A1* | 11/2004 | Hobmeyr | H01M 8/04097 |
| | | | 429/415 |
| 2004/0261428 A1* | 12/2004 | Murry | B64D 13/06 |
| | | | 62/86 |
| 2005/0100462 A1* | 5/2005 | Hobmeyr | F04D 29/122 |
| | | | 417/423.12 |
| 2006/0046129 A1* | 3/2006 | Hobmeyr | F04D 29/122 |
| | | | 277/306 |
| 2007/0071057 A1 | 3/2007 | Ohta et al. | |
| 2009/0155102 A1 | 6/2009 | Park et al. | |
| 2009/0311565 A1* | 12/2009 | Ishikawa | B60H 1/00885 |
| | | | 429/413 |
| 2011/0135519 A1 | 6/2011 | Cho et al. | |
| 2012/0180482 A1* | 7/2012 | Kapich | F02B 37/10 |
| | | | 60/608 |
| 2012/0328969 A1 | 12/2012 | DeWald et al. | |

FOREIGN PATENT DOCUMENTS

| | | |
|---|---|---|
| DE | 103 27 535 A1 | 1/2005 |
| JP | 2005-291015 A | 10/2005 |
| JP | 2007-24015 A | 2/2007 |
| WO | WO 2012032392 A1 * | 3/2012 ......... F04D 13/0606 |

OTHER PUBLICATIONS

Extended European Search Report, dated Oct. 18, 2016, for European Application No. 14791989.8-1360 / 2992566, 9 pages.

* cited by examiner

FUEL CELL SYSTEM BLOWER CONFIGURATION

This invention was made with U.S. Government support under Contract No. DE-NT0003894 awarded by the Department of Energy. The Government has certain rights in this invention.

BACKGROUND

Fuel cells are useful for generating electricity. Fuel cell components facilitate an electrochemical reaction between reactants such as hydrogen and oxygen. Typical fuel cell systems include pumps or blowers for circulating the reactants within the system.

Solid oxide fuel cells, for example, use a high temperature blower to circulate reactant gas to the anode components of a cell stack assembly. Such blowers are typically custom made to operate at high speed to deliver the required performance and are capable of withstanding high operating temperatures to avoid heat loss. The requirements on such blowers tends to introduce additional expense into a fuel cell system.

SUMMARY

An exemplary fuel cell system includes a cell stack assembly having a plurality of cathode components and a plurality of anode components. A first reactant blower has an outlet situated to provide a first reactant to the cathode components. A second reactant blower has an outlet situated to provide a second reactant to the anode components. The second reactant blower includes a fan portion that moves the second reactant through the outlet. The second reactant blower also includes a motor portion that drives the fan portion and a bearing portion associated with the fan portion and the motor portion. The motor portion has a motor coolant inlet coupled with the outlet of the first reactant blower to receive some of the first reactant for cooling the motor portion.

In an exemplary embodiment, at least some of the second reactant moves from the fan portion into the bearing portion. At least some of the first reactant moves from the motor portion into the bearing portion where the first reactant is able to dilute a concentration of the second reactant in the bearing portion.

An exemplary method of operating a blower in a fuel cell system includes using a first reactant for cooling a motor portion of the blower. A fan portion of the blower is used for directing a second reactant toward a portion of a cell stack assembly. A concentration of the second reactant in a bearing portion of the blower is diluted with some of the first reactant from the motor portion.

Various aspects of disclosed example embodiments will become apparent to those skilled in the art from the following detailed description. The drawings that accompany the detailed description can be briefly described as follows.

DETAILED DESCRIPTION

Figure 1:
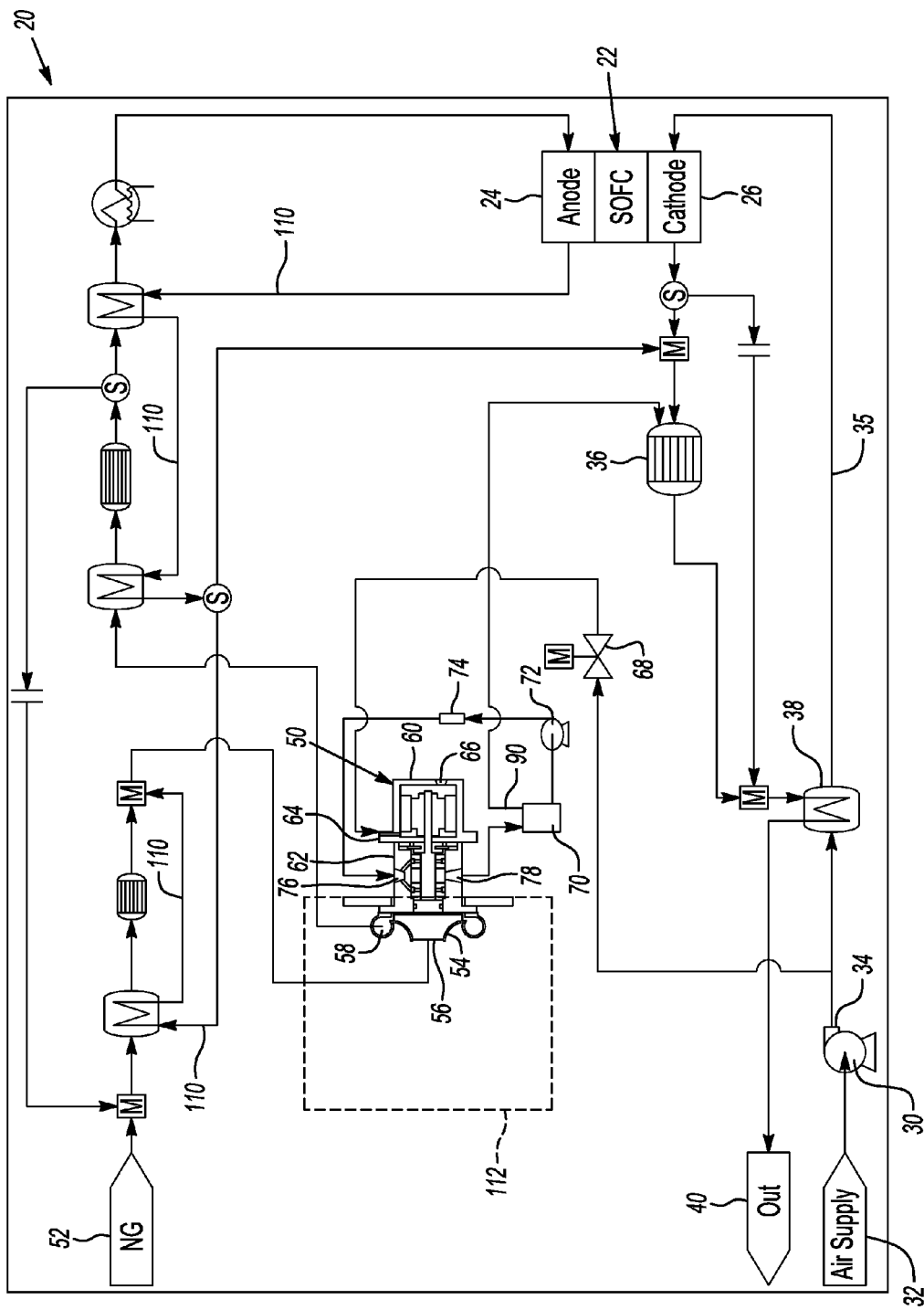
FIG. 1 schematically illustrates selected portions of a fuel cell system designed according to an embodiment of this invention.

FIG. 1 schematically illustrates a fuel cell system 20. A cell stack assembly 22 includes a plurality of anode components 24 and a plurality of cathode components 26 that are used in a known manner for facilitating an electrochemical reaction for generating electricity. In the illustrated example, the fuel cell system comprises a solid oxide fuel cell system.

A first blower 30 is situated for delivering a first reactant, such as oxygen, from a first reactant supply 32 to the cathode components 26 of the cell stack assembly 22. The first blower 30 includes a blower outlet 34 for directing the first reactant through one or more conduits 35 to the cathode components 26. Cathode exhaust, which includes the first reactant, is burned in a catalytic burner 36 and exhausted through a vent 40.

A second blower 50 is situated for directing a second reactant to the anode components 24. The illustrated example includes a supply 52 of the second reactant, such as hydrogen. The second blower 50 differs from blower arrangements typically provided within a fuel cell system. The example second blower 50 includes a fan portion 54 that has an inlet 56 for receiving the second reactant and an outlet 58 for directing the second reactant to the anode components 24. In one example, the fan portion 54 comprises a plurality of turbine blades.

In one example, the fan portion 54 comprises turbine blades configured like those of an automotive turbo charger. Situating the turbine fan blades within the fan portion 54 and associating them with the motor portion 60 to achieve a desired direction of rotation renders the turbine fan blades useful for directing the second reactant through the outlet 58 at high pressures.

The second blower 50 includes a motor portion 60 for driving the fan portion 54. A bearing portion 62 is associated with the motor portion 60 and the fan portion 54. In this example, the bearing portion 62 is situated between the motor portion 60 and the fan portion 54.

The example of FIG. 1 includes a cooling arrangement for cooling the motor portion 60. In this example, some of the first reactant from the blower outlet 34 is provided to a motor coolant inlet 64. The first reactant cools components of the motor portion 60. The illustrated example includes a vent 66 for releasing the first reactant coolant from the motor portion 60.

The example of FIG. 1 includes a mass flow control valve 68 for selectively controlling the amount of first reactant provided for cooling the motor portion 60. The mass flow control valve 68 is selectively operated to control an amount of coolant provided to the motor portion 60. This aspect of the illustrated example allows for selectively controlling a pressure of the first reactant within the motor portion 60.

A bearing lubricant supply 70 and a pump 72 provide a bearing lubricant to the bearing portion 62. In one example, the bearing lubricant comprises oil. The bearing lubricant delivered by the pump 72 passes through a lubricant cooler 74 in this example before entering the bearing portion at a lubricant inlet 76, which is formed in a bearing housing 77. An outlet 78 allows lubricant to leave the bearing housing 77 and return to the bearing lubricant supply 70. In one example, the outlet 78 is situated in the bearing housing 77 to allow lubricant to return to the supply 70 by a gravity feed to avoid flooding the bearing cavity within the bearing housing 77. In some examples, the inlet 76 has a smaller flow dimension than the outlet 78 to prevent any flow resistance of lubricant returning to the supply 70.

Figure 2:
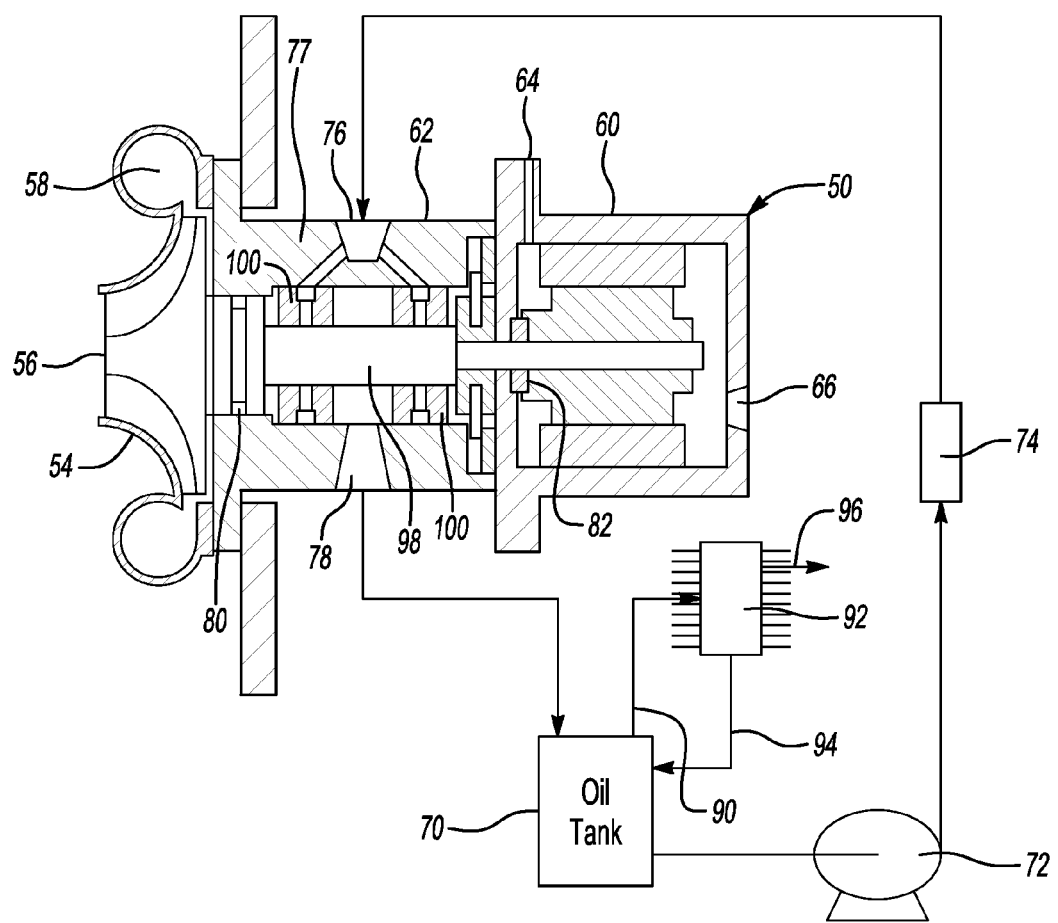
FIG. 2 schematically illustrates selected portions of a blower arrangement designed according to an embodiment of this invention.

As best appreciated from FIG. 2, the second blower 50 includes a first seal 80 at an interface between the bearing portion 62 and the fan portion 54. The first seal 80 is configured to resist passage of the second reactant in the fan portion 54 into the bearing portion 62. A second seal 82 is provided at an interface between the motor portion 60 and the bearing portion 62. The second seal 82 is configured to resist passage of motor coolant (e.g., the first reactant) from the motor portion 60 into the bearing portion 62.

The fan portion 54 is maintained at a first, high pressure for delivering the second reactant to the anode components 24 to achieve the required performance. A pressure within the bearing portion 62 is a second, lower pressure. In some examples, the pressure within the bearing portion 62 is approximately ambient. The first reactant within the motor portion 60 is maintained at a third pressure, which is higher than the second pressure in the bearing portion 62. The third pressure may be less than the first pressure within the fan portion 54.

Given that a higher pressure exists in the fan portion 54 compared to the second pressure within the bearing portion 62, at least some of the second reactant in the fan portion 54 will pass into the bearing portion 62. Given that the second reactant includes combustible gas (i.e., hydrogen), it is desirable to manage any of the second reactant within the bearing portion 62. One feature of the illustrated example for managing the second reactant within the bearing portion 62 includes using some of the first reactant from the motor portion 60 for diluting the concentration of the second reactant within the bearing portion 62. Maintaining a sufficient third pressure within the motor portion 60 to facilitate some of the first reactant moving into the bearing portion 62 introduces non-combustible gas (i.e., air) that dilutes the concentration of the second reactant within the bearing portion 62. The mass flow control 68 is selectively controlled in some examples to control the amount of first reactant that moves past the seal 82 to dilute second reactant in the bearing portion 62. In one example, information regarding the mass flow or pressure of the second reactant is used to determine a desired amount of first reactant that will provide a desired level of dilution.

Additionally, reactant gases within the bearing portion 62 become entrained in a flow of the bearing lubricant leaving the housing 77 through the drain opening 78. In the example of FIG. 1, the bearing lubricant supply 70 includes a vent 90 for directing any reactant gas from the lubricant supply 70 to the catalytic burner 36 for disposing of the reactant gas.

The example of FIG. 2 includes the vent 90 directed to a condenser 92 where the reactant gas separates from cooling, condensing bearing lubricant. Liquid bearing lubricant returns to the supply 70 through a return line 94 and the reactant gas escapes through a vent 96.

One feature of the illustrated example is that moving components such as a shaft 98 within the bearing portion 62 interact with bearings 100 that are made from non-arcing materials. In the event that there is insufficient lubricant supplied to the bearing portion 62, contact between the shaft 98, which may comprise steel, and the bearings 100 at high speeds will not introduce any potential for igniting reactant gas within the bearing housing 62 when the bearings are made from non-arcing materials. Example bearing materials include brass, aluminum and a hard, high temperature polyamide material.

As can be appreciated from FIG. 1, the second blower 50 is within a recirculation circuit 110 that recirculates at least some second reactant exhausted from the anode components 24 back toward the anode components 24. The second blower 50 is also useful for directing the second reactant from the supply 52 to the anode components 24.

Another feature of the example embodiment of FIG. 1 is that the fan portion 54 is maintained in a high temperature region 112 of the fuel cell system 20. In one example, the region 112 is a Class 1, Division 2 area or "hot box." Any leakage of the second reactant from the fan portion 54 will be diluted with purge air within the high temperature region 112. The bearing portion 62 and the motor portion 60 in this example are situated outside of the region 112. In one example, the motor portion 60 is situated near the power plant cabin ventilation system air inlet. In this position, additional airflow over the motor portion 60 assists in cooling the motor. Any potential leak of the second reactant from the fan portion 54 through the motor portion 60 will be diluted with air.

Figure 3:
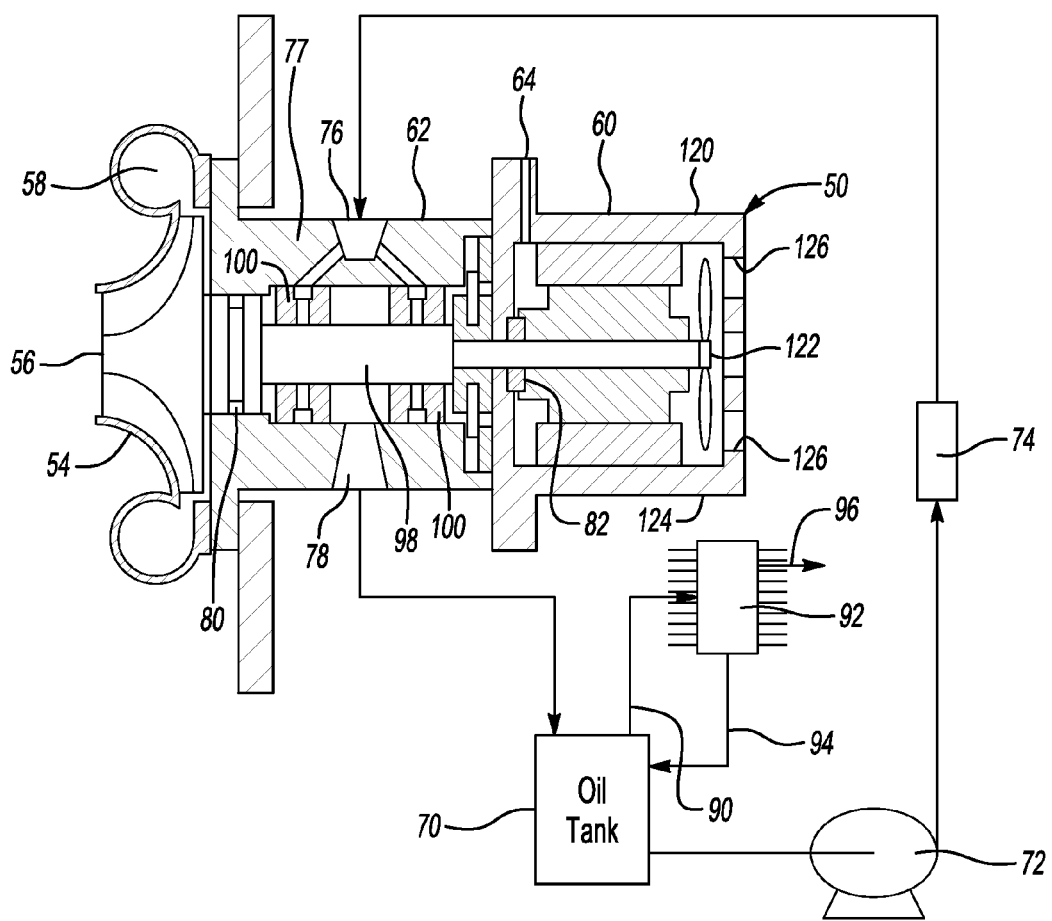
FIG. 3 schematically illustrates selected portions of another blower arrangement designed according to an embodiment of this invention.

FIG. 3 illustrates another second blower configuration. In this example the second blower 50 does not utilize the first reactant as a coolant for the motor portion 60'. Instead, a fan 120 is supported on a motor shaft 122 within a motor housing 124. As the motor shaft 122 rotates, the fan 120 rotates and draws air into the motor housing 124 through at least one cooling opening 126 in at least one side of the housing 124. The motor shaft 122 rotates for driving the fan portion 54 so the motor cooling function is accomplished without requiring additional energy consumption and without requiring any conduits or valves for delivering the first reactant to the motor portion as is done in the example of FIGS. 1 and 2.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell system, comprising:
a cell stack assembly including a plurality of cathode components and a plurality of anode components;
a first reactant blower having an outlet situated to provide a first reactant which is split into a first portion and a second portion, the first portion directed to the cathode components;
a second reactant blower having an outlet situated to provide a second reactant to the anode components, the second reactant blower comprising a fan portion that moves the second reactant through the outlet, a motor portion that drives the fan portion and a bearing portion associated with the fan portion and the motor portion, and the motor portion having a motor coolant inlet coupled with the outlet of the first reactant blower to receive at least some of the second portion of the first reactant; and
a mass flow control valve configured to selectively control a pressure of the second portion of the first reactant introduced into the motor portion of the second reactant blower by controlling an amount of the second portion of the first reactant that flows into the motor coolant inlet for cooling the motor portion, the mass flow control valve maintaining the pressure of the second portion of the first reactant introduced into the motor portion to be higher than a pressure in the bearing portion that is associated with the motor portion.

2. The fuel cell system of claim 1, wherein
the second reactant is configured to be at a first pressure in the fan portion; and
the pressure in the bearing portion is configured to be at a second pressure that is lower than the first pressure.

3. The fuel cell system of claim 2, wherein
at least some of the second reactant moves from the fan portion into the bearing portion; and
the second portion of the first reactant moves from the motor portion into the bearing portion, at least some of the second portion of the first reactant in the bearing portion diluting a concentration of the second reactant in the bearing portion.

4. The fuel cell system of claim 3, wherein
at least one of an amount of the first reactant provided to the motor portion or the pressure of the second portion of the first reactant in the motor portion is selectively adjustable to achieve a selected amount of dilution of the concentration of the second reactant in the bearing portion.

5. The fuel cell system of claim 2, wherein
the bearing portion comprises a bearing housing between the fan portion and the motor portion; and
the system comprises:
a first seal at an interface between the bearing portion and the fan portion, the first seal being configured to resist movement of the second reactant from the fan portion into the bearing housing; and
a second seal at an interface between the bearing portion and the motor portion, the second seal being configured to resist movement of the second portion of the first reactant from the motor portion into the bearing housing.

6. The fuel cell system of claim 5, wherein the bearing housing includes an outlet configured to allow any second reactant in the bearing housing to exit the bearing housing.

7. The fuel cell system of claim 1, comprising
a source of bearing lubricant;
a lubricant pump that directs lubricant from the source to the bearing portion; and
a vent for venting any of the reactants associated with the lubricant.

8. The fuel cell system of claim 7, comprising
a supply conduit between the lubricant pump and the bearing portion; and
a return conduit between the bearing portion and the source of bearing lubricant situated for returning bearing lubricant from the bearing portion to the source, any of the reactants in the bearing portion being carried away from the bearing portion through the return conduit by the bearing lubricant moving between the bearing portion and the source;
wherein the vent is situated to allow any reactant to escape from the source of lubricant.

9. The fuel cell system of claim 8, wherein
the source of lubricant comprises a tank;
the vent comprises a conduit coupled with the tank, a cooler configured for separating lubricant from a fluid flow into the cooler that includes some of the reactant from the tank and some of the lubricant from the tank, and a vent opening configured to allow any separated reactant to exit the cooler; and
the cooler is coupled with the tank to allow liquid lubricant in the cooler to flow into the tank.

10. The fuel cell system of claim 1, wherein the bearing portion comprises bearing components that are made of a non-arcing material.

11. The fuel cell system of claim 10, wherein the non-arcing material comprises at least one of brass, aluminum or a polyamide.

12. The fuel cell system of claim 1, wherein
the fan portion comprises a plurality of turbine blades; and
the motor portion comprises an electric motor.

13. The fuel cell system of claim 1, wherein
the fuel cell system comprises a high temperature region;
the fan portion is situated in the high temperature region; and
the motor portion is situated in a lower temperature area.

14. The fuel cell system of claim 1, comprising a recycle circuit configured to carry at least some of the second reactant exhausted from the anode components back toward the anode components and wherein the second reactant blower is within the recycle circuit.

15. A method of operating an anode blower in a fuel cell system, wherein the anode blower includes a fan portion, a motor portion that drives the fan portion and a bearing portion associated with the motor portion and the fan portion, the method comprising:
directing a first reactant for cooling the motor portion via a cathode blower, the first reactant being split into a first portion and a second portion, the first portion directing to cathode components of a fuel cell and at least some of the second portion directing to a coolant inlet of the motor portion for cooling the motor portion;
selectively controlling a pressure of the second portion of the first reactant introduced into the motor portion via a mass flow control valve by controlling an amount of the second portion of the first reactant that flows into the coolant inlet of the motor portion for cooling the motor portion, the mass flow control valve maintaining the pressure of the second portion of the first reactant in the motor portion to be higher than a pressure in the bearing portion;
using the fan portion for directing a second reactant toward a portion of a cell stack assembly; and
diluting a concentration of the second reactant in the bearing portion with the second portion of the first reactant from the motor portion.

16. The method of claim 15, comprising establishing a first pressure of the second reactant in the fan portion;
establishing a second pressure in the bearing portion, the second pressure being lower than the first pressure.

17. The method of claim 15, comprising venting the second reactant from the bearing portion.

18. The method of claim 15, comprising
recycling at least some of the second reactant by using the anode blower to direct at least some of the second reactant exhausted from the cell stack assembly back toward the cell stack assembly.

19. A fuel cell system, comprising:
a cell stack assembly including anode and cathode components; and
a first reactant blower having an outlet situated to provide a first reactant which is split into a first portion and a second portion, the first portion directed to the cathode components;
a second blower configured for supplying a second reactant to the anode components, the second blower including a fan portion and a motor portion for driving the fan portion, the motor portion including a motor housing, a motor shaft that is supported for rotating in the motor housing and a fan supported for rotation with the motor shaft, the fan being configured to introduce air into the motor housing as the fan rotates with the motor shaft for cooling the motor portion, the motor portion including a motor coolant inlet fluidly connected with the outlet of the first reactant blower to receive at least some of the second portion of the first reactant for cooling the motor portion, and a mass flow control valve configured to selectively control a pressure of the second portion of the first reactant introduced into the motor portion by controlling an amount of the second portion of the first reactant that flows into the motor coolant inlet for cooling the motor portion, the mass flow control valve maintaining the pressure of the second portion of the first reactant in the motor portion to be higher than a pressure in the bearing portion.

20. A fuel cell system, comprising:
a cell stack assembly including a plurality of cathode components and a plurality of anode components;
a first reactant blower which directs a first reactant through a first reactant blower outlet, the first reactant split into a first portion and a second portion, the first portion directed through the outlet of the first reactant blower to the cathode components and then exhausted from the cathode components to a vent; and
a second reactant blower including:
an inlet to receive a second reactant;
a second reactant blower outlet through which the second reactant is directed to the anode components;
a bearing portion;
a motor portion having a motor coolant inlet; and
a mass flow control valve configured to selectively control a pressure of the second portion of the first reactant introduced into the motor portion by controlling an amount of the second portion of the first reactant that flows into the motor coolant inlet for cooling the motor portion, the mass flow control valve maintaining the pressure of the second portion of the first reactant in the motor portion to be higher than a pressure in the bearing portion,
a fan portion which is driven by the motor portion and directs the second reactant through the second reactant blower outlet to the anode components.

21. The fuel cell system of claim 20, further comprising:
a housing which houses the bearing portion;
a supply of bearing fluid; and
a bearing portion pump which directs the bearing fluid to the bearing portion.

22. The fuel cell system of claim 21 wherein the housing includes an outlet which is arranged to return at least a portion of the bearing fluid from the housing to the supply of bearing fluid.

23. The fuel cell system of claim 20 wherein the fan portion includes a plurality of turbine blades which are rotatably coupled to the motor portion.

* * * * *